United States Patent Office.

ARTHUR GUY MORVAN, OF NEW YORK, N. Y.

Letters Patent No. 108,041, dated October 4, 1870.

IMPROVEMENT IN ELECTRO-PHOTO DAMASKENING AND ENAMELING.

The Schedule referred to in these Letters Patent and making part of the same.

I, ARTHUR GUY MORVAN, of the city of New York, State of New York, have invented a certain process, of which the following is a specification.

The following is a description of a new and improved process, viz:

Electro-Photo Damaskening and Enameling.

This process has for its object the reproduction of works of art, or of nature, by means of light, electricity, and the acids.

The difficulty to this day in photographing on metals has been to make them perfectly smooth and even, so as to coincide with the negatives and positives on glass.

The price of steel is too high, and often the steel is not pure. It is difficult to even and polish it.

The same is the case with copper plates, and still more so with silver and gold plates.

The most perfect mills for rolling, pressing, and polishing metals cannot make them as smooth and even as glass.

To obviate all these inconveniences, and to arrive at a perfect and practicable result, is the object of this invention, which I shall here describe.

First, I take a thick French glass, perfectly and finely grained, and I make thereon a print, through the well-known means of electrotypy. I obtain a sheet of that kind of metal grained and perfectly even, which will most certainly coincide with the negative or positive on glass. (I can employ both.) I prefer the copper, because I can give it all possible forms, such as cups, vases, plates, &c. The metal on which I operate is of the thickness of a sheet of paper.

Second, the moment I wish to make use of this plate for photographing, I soak it with muriatic acid, wash it with pure water, and, while it is yet wet, I put on a varnish composed of albumen, or other organic matter, and a concentrated solution of bichromate of potash, or other products sensitive to the light, such as chromic salts or manganese salts. When the plate is covered with the above, I rub it, while it is wet, with a piece of muslin, until the varnish is dry. By this means the coating is of very little thickness.

Third, I expose the plate to the light, the negative as well as the positive, in the common way. When the pattern or the photograph which is to be produced begins to show in dark brown, I take it away. I can make use as well of the solar camera to print on metals, and to make, by these means, all sizes and dimensions.

Fourth, if, for instance, I want to produce a photograph of a pattern in silver on copper, I would make use of a positive by transparence. In the opposite case, that is to say, a pattern in copper on silver, I would take the negative in silver on copper.

Fifth, in retiring the copper from the light, I wash it well, and put it in a weak bath of nitrate of mercury. As soon as the picture appears, and when it is complete, I take it out, wash it, and submit it to the action of an electric pile, in a bath rich with silver, (common in electrotypy.) The silver settles in the place of the mercury, and, at the same moment, I have a complete photograph in silver on copper, as soon as I have dissolved the varnish, which does not resist with acetic acid mixed with water.

Sixth, supposing, now, I wish to obtain a photograph in iron on silver, I take, then, a copper plate prepared in the former manner, and I make thereon, by means of the pile, a deposit of iron. I varnish it with the varnish already described, bring it to the light, wash it, and acidulate it, in such a way that the iron dissolves itself in those parts where the light does not influence it. I then dissolve the varnish, and I get a photograph in copper on iron, or in iron on copper. I then make a deposit of silver, by means of the electric pile. The silver deposits itself on the copper, and not on the iron. I have then a photograph in iron on silver or silver on iron, according as I use a positive or a negative.

What I say about the iron and the silver can evidently be applied to all other metals which are susceptible to the workings of electricity.

Seventh, to enamel, I make a photograph in copper on gold by the process above described. I then etch the copper with the acid, and I get the photograph in depth or relief, which can serve to print from, and which can be enameled through the known process. The plate being enameled, I put on it a deposit of silver or gold or iron, and I get all the effects possible.

Eighth, it will be easily understood that what I have said concerning the copper plates may also be applied to silver or gold plates.

The solidity of the galvanic deposits is insured, for this reason, that the metals on which I operate are grained.

The deposits obtained are dull, but it is easy to polish either the whole or a part through the means well known to the trade.

This observation applies when objects are taken from nature.

For engravings, I use polished metals.

I am aware of the English patent of Newton, No. 1,835, of 1857, (being a communication from Charles Megre,) but, in that process, the plates used are common plates, while I use grained metallic plates, produced by electro-deposition upon grained glass, thereby insuring the solidity of the galvanic deposit, and *fac simile* of engravings, &c., which cannot be accomplished by the plates used by them.

Having thus described my invention,
I claim—
The process of electro-photo damaskening and enameling, substantially as described.

ARTHUR GUY MORVAN.

Witnesses:
  B. WEVER,
  O. BINDER.